July 26, 1932. D. BELCHER 1,868,686
METHOD OF AND APPARATUS FOR CLOSING AND SEALING CONTAINERS
Filed May 12, 1930 12 Sheets-Sheet 1

Inventor
DANIEL BELCHER
By Paul, Paul Moory
ATTORNEYS

July 26, 1932.   D. BELCHER   1,868,686
METHOD OF AND APPARATUS FOR CLOSING AND SEALING CONTAINERS
Filed May 12, 1930   12 Sheets-Sheet 2

Inventor
DANIEL BELCHER
By
ATTORNEYS

July 26, 1932.  D. BELCHER  1,868,686
METHOD OF AND APPARATUS FOR CLOSING AND SEALING CONTAINERS
Filed May 12, 1930  12 Sheets-Sheet 7

Inventor
DANIEL BELCHER
By Paul, Paul & Moore
ATTORNEYS

July 26, 1932. D. BELCHER 1,868,686
METHOD OF AND APPARATUS FOR CLOSING AND SEALING CONTAINERS
Filed May 12, 1930 12 Sheets-Sheet 8

Inventor
DANIEL BELCHER
By
ATTORNEYS

July 26, 1932. D. BELCHER 1,868,686
METHOD OF AND APPARATUS FOR CLOSING AND SEALING CONTAINERS
Filed May 12, 1930 12 Sheets-Sheet 9
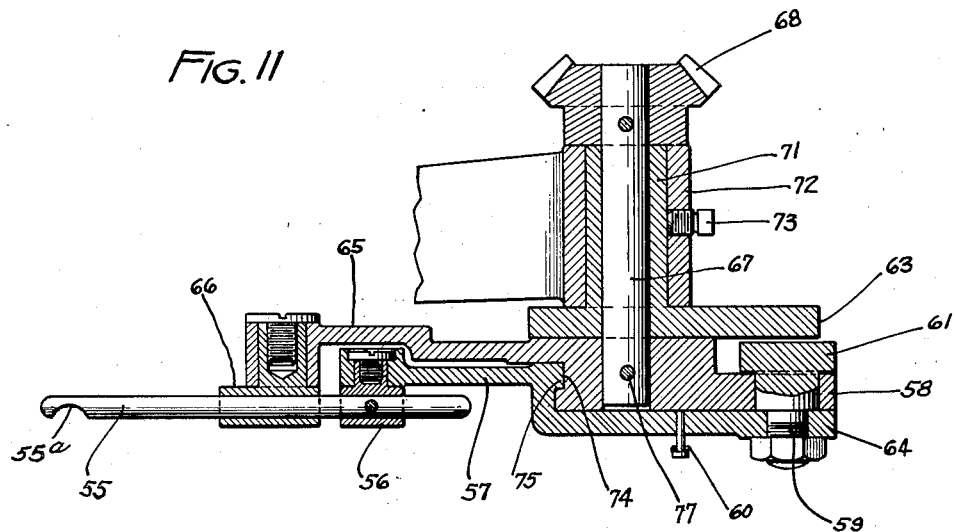
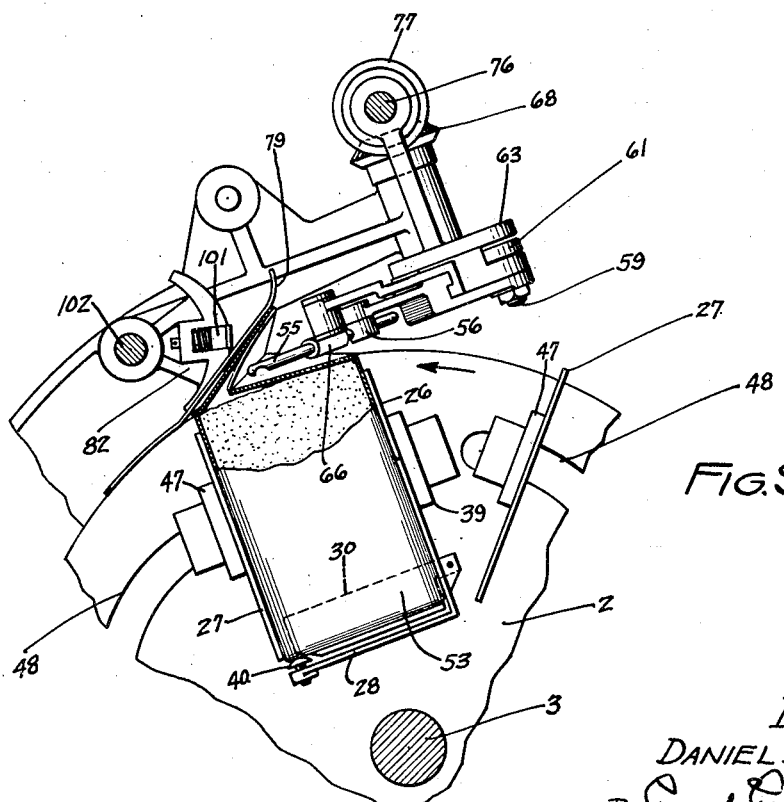
Inventor
DANIEL BELCHER
ATTORNEYS July 26, 1932.                 D. BELCHER                 1,868,686
         METHOD OF AND APPARATUS FOR CLOSING AND SEALING CONTAINERS
                     Filed May 12, 1930    12 Sheets-Sheet 11

Inventor
DANIEL BELCHER
By
    ATTORNEYS

July 26, 1932.   D. BELCHER   1,868,686

METHOD OF AND APPARATUS FOR CLOSING AND SEALING CONTAINERS

Filed May 12, 1930    12 Sheets-Sheet 12

Inventor
DANIEL BELCHER
By Paul, Paul Kilroy
ATTORNEYS.

Patented July 26, 1932

1,868,686

UNITED STATES PATENT OFFICE

DANIEL BELCHER, OF MINNEAPOLIS, MINNESOTA, ASSIGNOR TO BEMIS BRO. BAG CO., OF MINNEAPOLIS, MINNESOTA, A CORPORATION OF MISSOURI

METHOD OF AND APPARATUS FOR CLOSING AND SEALING CONTAINERS

Application filed May 12, 1930. Serial No. 451,702.

This invention relates to an improved method of and apparatus for closing and sealing the open tops of containers or paper bags having flexible walls, and adapted to contain finely divided material as, for example, flour.

An object of the invention is to provide an improved method of closing the open top of a container which consists in folding a portion of the wall of the container top inwardly, thence folding an oppositely disposed wall portion of the container top over said first folded portion, extending said folded wall portions outwardly beyond the body of the container and applying pressure thereto, and subsequently folding said outwardly extending wall portions inwardly against the body of the container and securing them in such folded positions.

A further object is to provide an improved method of closing and sealing an open bag top which consists in squaring the walls of the bag, then gumming an end wall of the open bag mouth and folding it and portions of the side walls of the bag mouth inwardly, then folding the opposite end wall and other portions of the side walls inwardly over said first folded wall portions, spreading the partially folded side wall portions outwardly beyond the walls of the bag body and applying pressure thereto, gumming surfaces of said extended wall portions, and subsequently folding them inwardly over the bag body in closing relation, and temporarily retaining said wall portions in their folded positions to allow the gum to set and seal the bag top.

A further object is to provide an apparatus for closing and sealing the open tops of bags filled with a material such as flour, comprising a movable member provided with a plurality of compartments each having movable walls adapted to be spread apart to enlarge the compartments whereby a bag or container may readily be inserted thereinto, means for actuating said movable container walls to cause them to compress the walls of a bag to shape the body thereof during movement of the member and means for folding the walls of the bag top inwardly against the body of the bag and applying a suitable adhesive thereto, whereby when the walls of the bag mouth are folded into closing position, the bag mouth will be sealed and the bag, when discharged from the compartment, will be properly shaped.

A further object is to provide an improved bag closing and sealing machine capable of closing and sealing the open tops of filled bags without the use of gummed tape, strings, wire, or other separable securing means, and which also is capable of closing and sealing bags the walls of which have not been previously creased to facilitate folding.

A further object is to provide a machine more particularly adapted for use to fold and seal the open tops of flexible, pre-made paper bags of rectangular cross-section, which have previously been filled with a material to substantially a predetermined level, whereby the wall portions of the bag mouth will project above the material in the bag a distance sufficient to cause each end wall of the bag mouth, when folded inwardly over the bag top, to cover substantially more than one-half of the cross-sectional area of the bag top, whereby when the other end wall is folded over said first folded end wall, it will over-lap said first folded end wall so that said two end walls may be united and substantially sealed by the application of a suitable gum or adhesive to a surface of one of said end walls.

Features of the invention reside in the construction and arrangement of the walls of the compartments, whereby said walls may be moved towards and away from one another to facilitate inserting a bag into a compartment, and to provide means for shaping the bag body before closing the open top thereof; the means for folding the walls of the open bag top and spreading the partially folded wall portions outwardly beyond the side walls of the bag; the means for applying pressure to the extended bag top wall portions to crease the same; the means for gumming surfaces of the wall portions to be folded; the means provided at the bottom of each compartment for properly positioning the bags or containers therein; the means for folding the partially folded extended wall portions of the bag top inwardly against the bag body and temporarily holding said folded wall portions in folded positions; the means for causing the bags to be discharged from the compartments in an inverted position so that the filled bags will be supported upon the sealed tops thereof, thereby preventing the folded wall portions from unfolding while the gum is wet; the means for laterally ejecting the sealed bags or containers from the machine; and, in the general construction of the apparatus as a whole, which is comparatively simple and inexpensive, whereby the machine may be manufactured at a nominal cost.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 9 is a detail sectional view showing the means for initially folding the walls of the bag top;

Figure 11 is an enlarged detail sectional view on the line 11—11 of Figure 10, showing one of the folding fingers and the general construction of the operating mechanism directly associated therewith;

Figure 6:
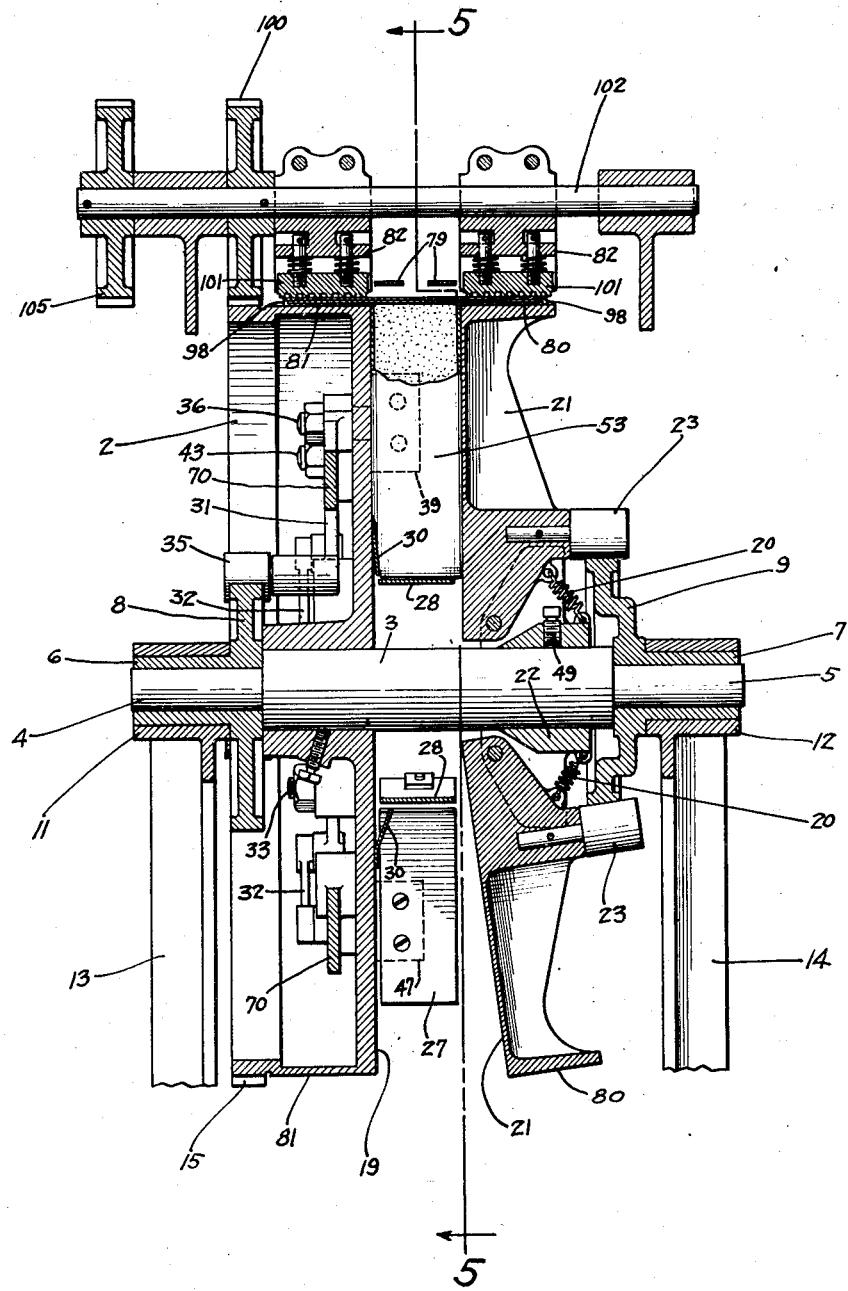
Figure 6 is a detail sectional view substantially on the line 6—6 of Figure 5, showing the means for compressing the partially folded wall portions of the bag top and gumming surfaces thereof, some of the parts being omitted.

The novel bag closing and sealing machine featured in this invention is shown comprising a rotatable member 2 mounted upon and secured to a shaft 3, preferably having reduced end portions 4 and 5 rotatably mounted in sleeves 6 and 7, respectively, provided upon a pair of fixed cams 8 and 9, as best shown in Figure 6. The sleeves 6 and 7 are non-rotatably supported in split hubs 11 and 12 provided at upper portions of the side frame members 13 and 14 of the machine frame. The rotatable member 2 will hereinafter be referred to as a drum.

The drum 2 is provided with a peripheral gear 15, as best shown in Figure 6, which meshes with a drive pinion 16 mounted upon and secured to a drive shaft 17, rotatably mounted in suitable bearings provided on the machine frame. A pulley 18 is secured to the drive shaft 17 adapted to be connected with a suitable source of power, not shown. The drum 2 rotates continuously when the machine is operating under normal conditions.

Figure 1:
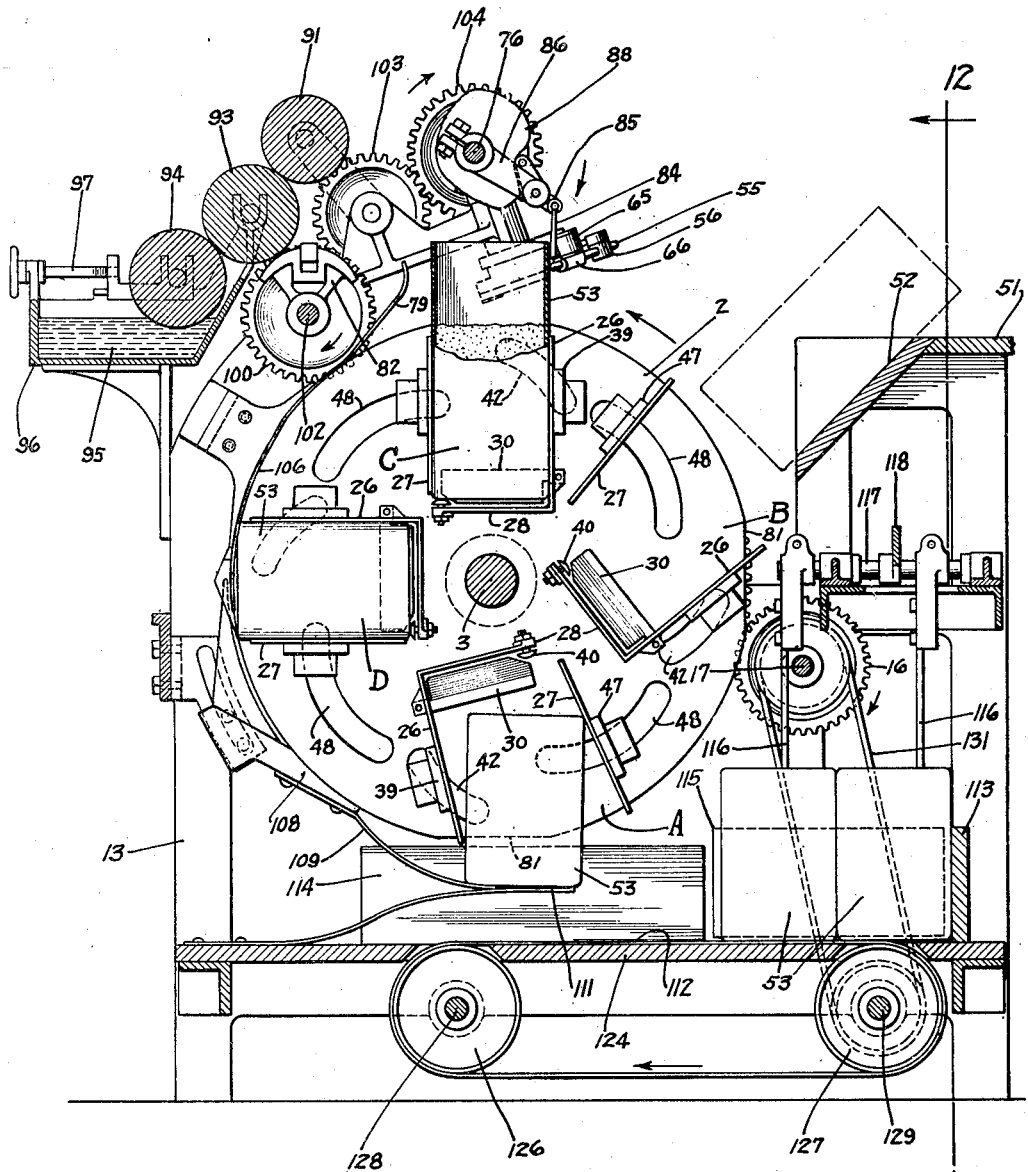
Figure 1 is a longitudinal sectional elevation showing a compartment positioned to receive a bag and another compartment actuated to discharge a sealed bag.
Figure 5:
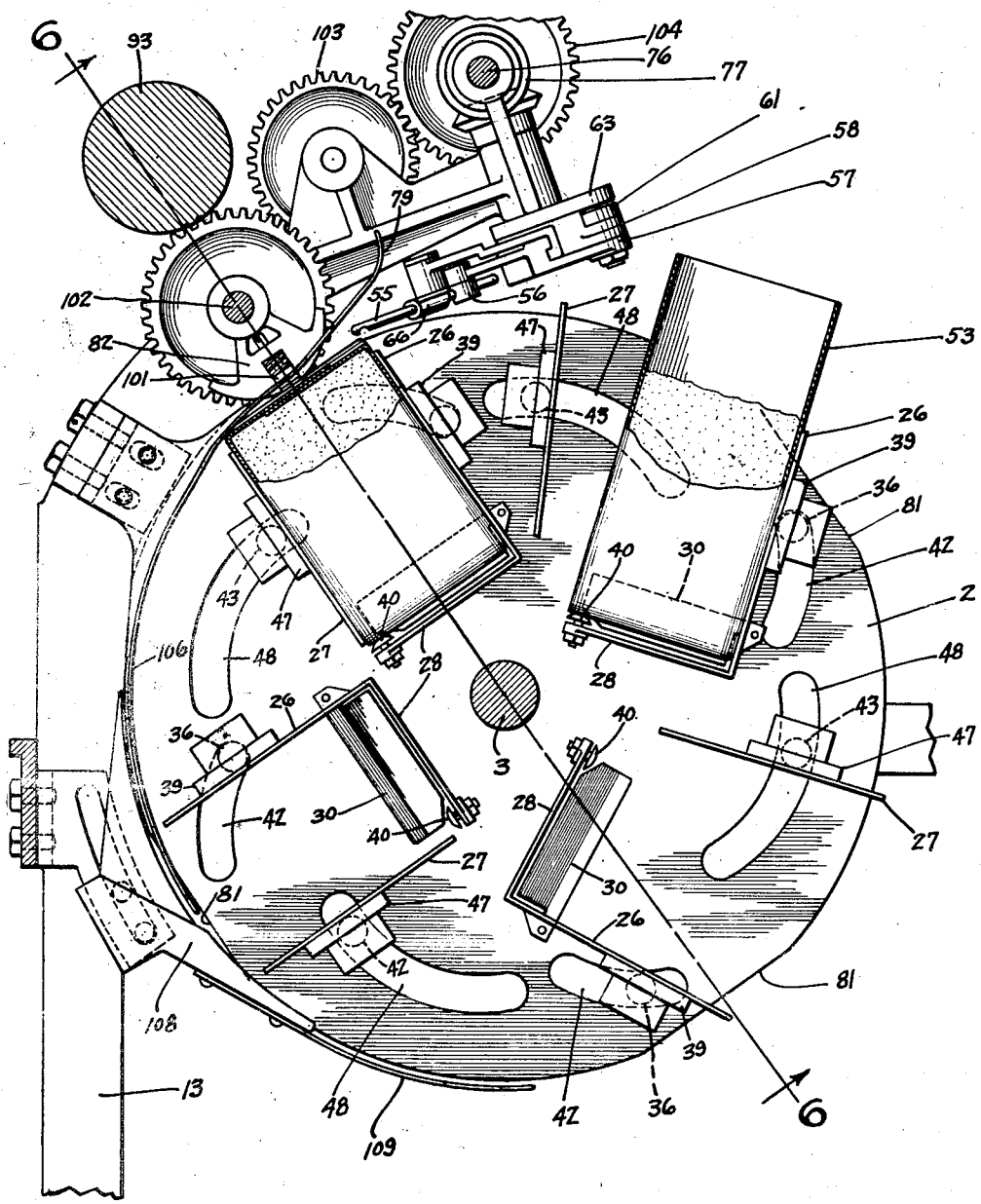
Figure 5 is a detail sectional view on the line 5—5 of Figure 6, showing the movable walls of some of the compartments actuated to shape the bag bodies.

The drum 2 is further provided with a plurality of compartments each adapted to receive a filled container or bag to be sealed. These compartments are best shown in Figures 1, 5, and 6. In the drawings, these compartments are shown as being of rectangular cross-section but it is to be understood that they may be of other shapes without departing from the scope of the invention. The side wall members of the compartments are defined by the face 19 of the drum 2 and a series of hinged side wall members 21. As shown in Figure 6, the wall members 21 are pivotally mounted upon a hub 22 adjustably secured to the shaft 3, and have their outer portions adapted to swing towards and away from the face plate 19 of the drum, as shown in the lower portion of Figure 6.

Figure 2:
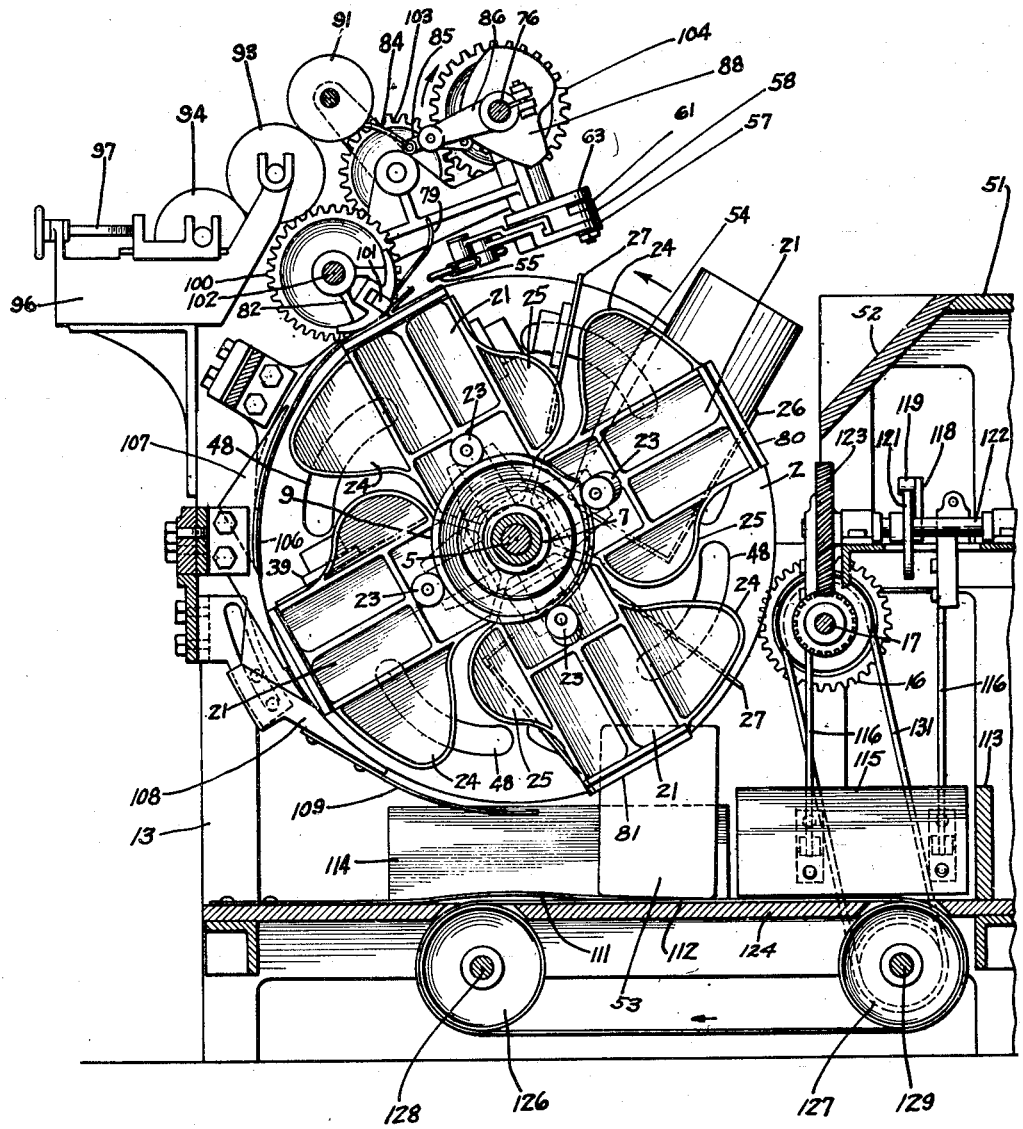
Figure 2 is a vertical sectional view substantially on the line 2—2 of Figure 4, with some of the parts omitted, showing the drum slightly advanced from the position shown in Figure 1, and showing the movable side wall members of the compartments.

Each wall member 21 is shown provided with a roller 23 adapted to roll upon the periphery of the fixed cam 9 whereby the wall members 21 are actuated when the drum is rotated, it being understood that the members 21 rotate simultaneously with the drum because of the hub 22 being secured to the shaft 3, to which the drum also is secured, as hereinbefore stated. A spring 20 is attached to each wall member 21 to hold the rollers 23 in engagement with the periphery of the cam 9. Each side wall 21 is further provided with lateral extensions 24 and 25, as shown in Figure 2, so that as the end walls 26 and 27 of each compartment are actuated to permit their complemental compartment to receive a bag, the side wall 21 of that particular compartment will substantially cover the distance between the two end walls of the open compartment into which a filled bag is delivered. Each end wall 26 has a lateral extension 28 which provide the bottom for the compartments.

The end walls 26 and 27 are mounted for pivotal movement and are operatively connected together by a bell crank 70 mounted upon a stud 29 secured to the drum 2, an arm 31 pivotally mounted upon the drum 2, and a link 32 which connects together the bell 70 and arm 31. The arm 31 is supported upon a pivot 33 and has an extension 34 provided with a roller 35 adapted to ride upon the periphery of the cam 8. (See Figure 7.) The end wall 26 is secured to the bell crank 70 by means of a stud 36 having a squared portion 37 received in the arm and secured thereto by means of a nut 38, as shown in Figure 8. The stud 36 is provided with a flanged portion 39 to which the end wall 26 is removably secured by suitable bolts 41, shown in Figures 6 and 8. The stud 36 passes through an arcuately formed slot 42 provided in the face plate 19 of the drum 2. Springs 50 are connected with the arms 31 to hold the rollers 35 in peripheral engagement with the cam 8.

Figure 7:
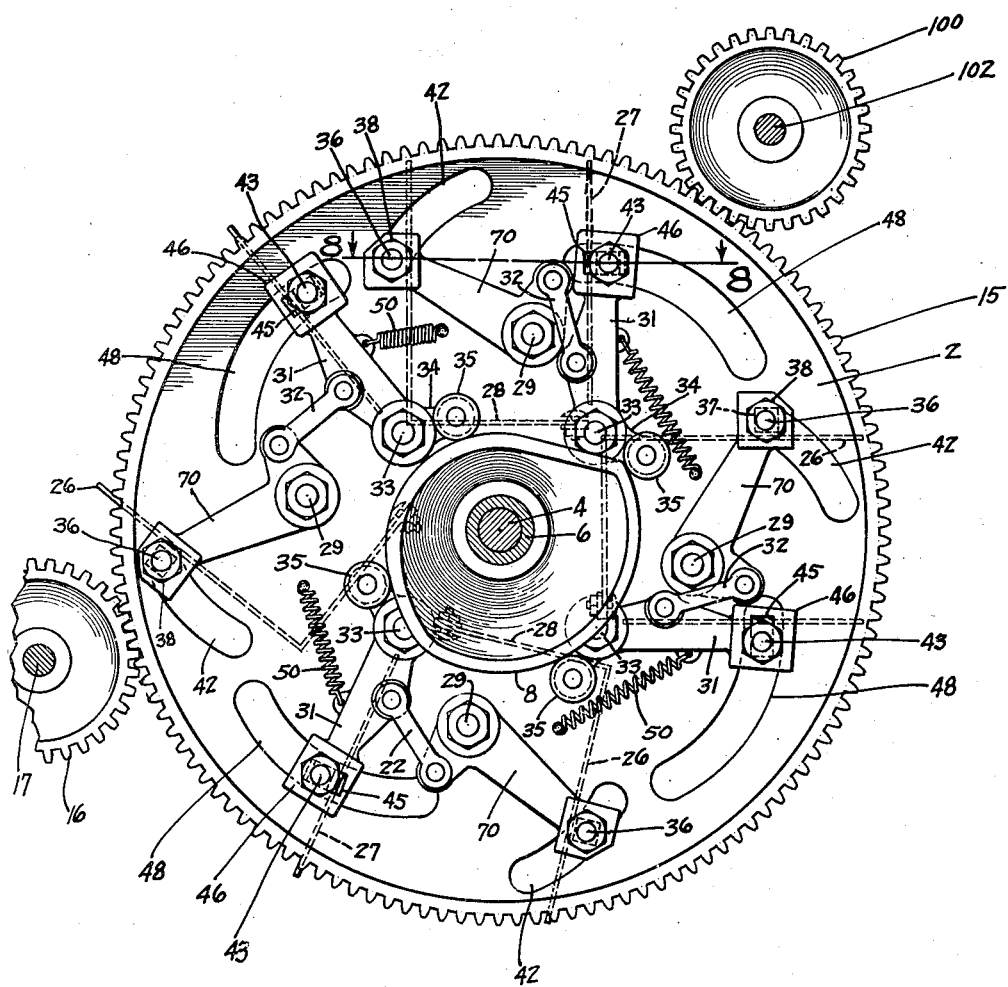
Figure 7 is an end view of the drum showing the means for actuating the end walls of the compartments.
Figure 8:
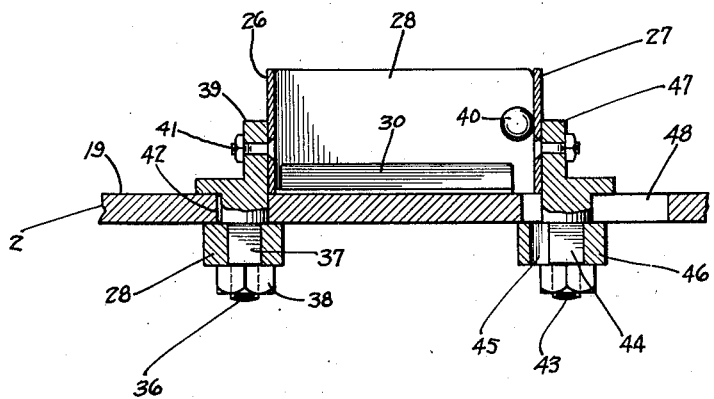
Figure 8 is a detail sectional view on the line 8—8 of Figure 7, showing the adjustable connection provided between an end wall of each compartment and its respective operating lever, and also the means provided in the bottom of each compartment for properly positioning the bag therein.
Figure 10:
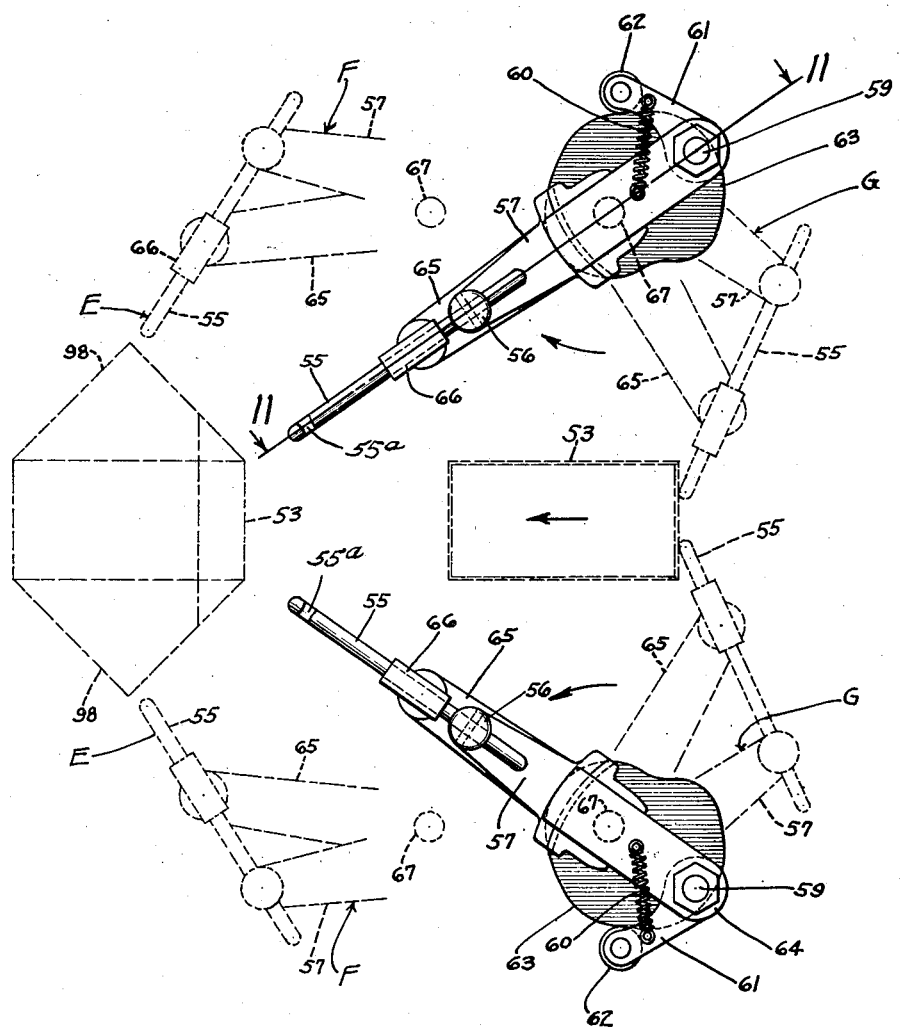
Figure 10 is a diagrammatic bottom view of the folding fingers, indicating various positions thereof assumed during each cycle of operation.

The end plate 27 is adjustably secured to the arm 31 by means of a stud 43 which also is provided with a squared portion 44 adjustably mounted in a slot 45 provided in the head 46 of the arm 31, (see Figures 7 and 8). The stud 43, like the stud 36, is provided with a flanged portion 47 to which the end wall 27 is secured. The stud 43 is movable in a curved slot 48 provided in the face plate 19 of the drum 2, as shown in Figure 7.

By thus adjustably mounting the end wall 27 upon the arm 31, the end wall may be moved towards or away from the relatively fixed end wall 26, whereby the compartment may be adapted for different sizes of bags or containers. The widths of the compartments may be varied to suit the widths of different sizes of bags by relatively moving the hub 22, upon which the side wall members 21 are pivotally mounted, towards or away from the face plate 19 of the drum. The hub 22 may be secured to the shaft 3 by such means as a set screw 49, shown in Figure 6. When the machine is adjusted for different widths of bags, it may be necessary to substitute end walls of different widths corresponding to the widths of the bags to be closed and sealed.

Figure 3:
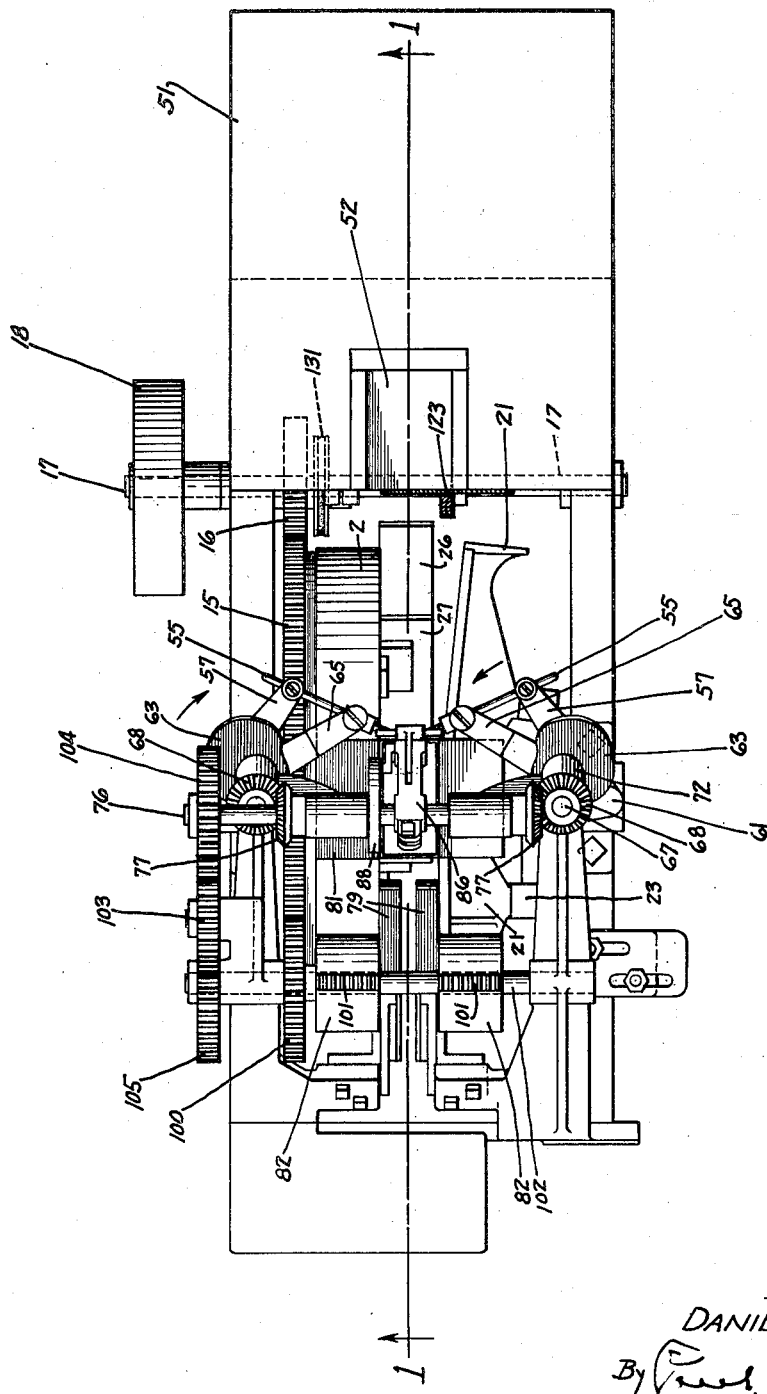
Figure 3 is a plan view of Figures 1 and 2 with the gum-applying mechanism omitted.
Figure 4:
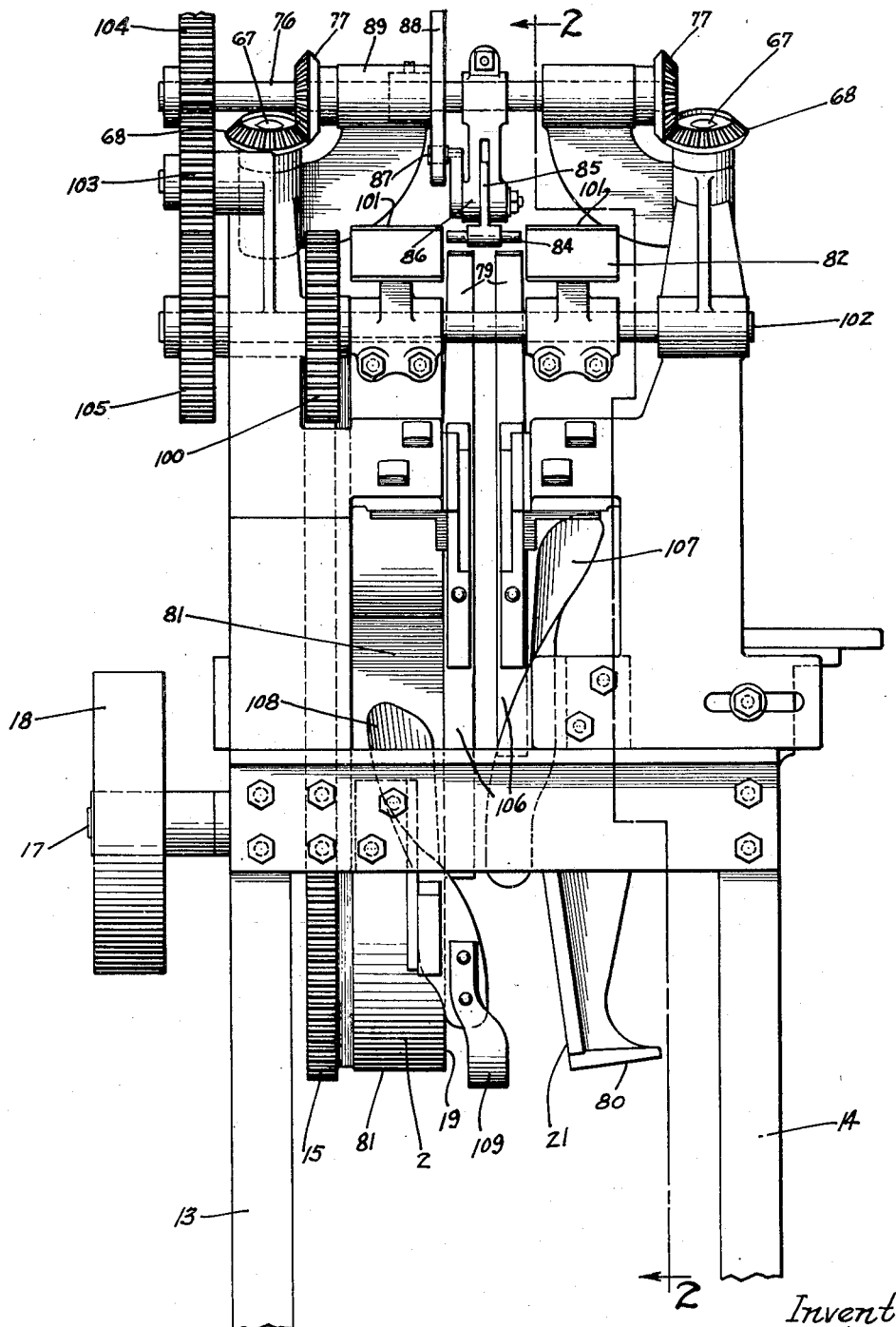
Figure 4 is a rear view of the machine on a larger scale with some of the parts omitted, and the lower portion thereof broken away.

Figure 1 illustrates the relative positions of the compartments and the walls thereof when the drum 2 is positioned with a compartment situated at the loading point about to receive a bag. As shown in Figures 1, 2, and 3, a table 51 may be supported upon the upper portion of the machine frame whereon the bags or containers to be closed and sealed may be placed before delivering them one at a time into the compartments. An inclined chute 52 is shown provided at one end of the table 51 adapted to receive a bag, as indicated in dotted lines in Figure 1. The cams 8 and 9 are so shaped that when a compartment reaches the position indicated at A in Figure 1, the end walls 26 and 27 and side wall members 21 will be actuated to cause the sealed bag 53 to be discharged from the lowermost compartment, as shown in Figure 1. The end walls 26 and 27 will continue to gradually spread apart and, at the same time, to move in one direction, while the compartment at A moves to the next position indicated at B in Figure 1, wherein the end walls of the compartment will be spread apart to recive a filled bag from the chute 52, as will readily be understood by reference to Figures 1 and 2.

Figure 14:
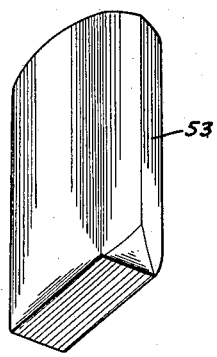
Figure 14 is a perspective view illustrating the distorted shape usually assumed by the body of a bag, when the latter is filled with flour or a similar material.
Figure 15:
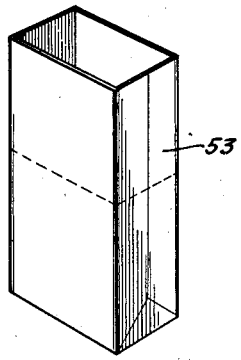
Figure 15 is a perspective view showing the shape assumed by the bag body, after the filled bag has been delivered into a compartment and the walls of the latter actuated to shape the bag.

Each wall member 21 is also swung outwardly from the position shown in the upper portion of Figure 6 to that shown in the lower portion of this figure, when said members reach the positions indicated at A in Figure 1. These members, like the end walls 26 and 27 of each compartment, will remain in the position shown in the lower portion of Figure 6 until the compartment has moved from A to B in Figure 1, after which the roller 23 of the side wall member 21 of the compartment located at B, will engage a projection 54 provided upon the periphery of the cam 9 which will cause that side member to be swung inwardly into engagement with the bag and thus compress the bag between it and the face plate 19 of the drum. As the drum continues to rotate, the side member 21 which has just been actuated by the projection 54 on the cam 9, drops back to its outwardly swung position and is then returned to the position shown in the upper portion of Figure 6, simultaneously as the end walls 26 and 27 are returned to their normal positions shown at C and D in Figure 1. When the walls of the compartments are thus positioned, the bags will be compressed between said walls and the bag body will be formed or shaped as clearly shown in Figures 15 and 16. Figure 14 illustrates the normal shape of a filled bag before being delivered to the bag closing machine.

Means are provided for squaring the bags with the walls of the compartments as each bag is delivered into a compartment. Such means is shown in Figures 1, 5, 6, and 8, and consists of a flexible plate 30 secured at one end to each rear end wall 26 of the compartments. These flexible plates are normally positioned as shown in the lower portion of Figure 6 so that when a bag is delivered into a compartment, as shown in Figure 5, the lower portion of the bag will engage the plate 30 whereby the bag will become aligned with the walls of the compartment, when the compartment walls are subsequently actuated to compress the body of the bag to shape the latter.

Figure 17:
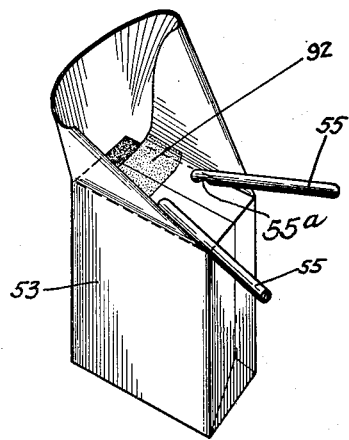
Figure 17 is a view illustrating the first step in folding the bag top.

An abutment member 40 is preferably provided in the bottom of each compartment, as shown in Figures 1 and 5. Each abutment member 40 is adjustably mounted in its complemental bottom wall 28 and is located to engage the lower forward corner of the bag as it is delivered into the compartment. By means of these abutments, the rear end walls of the bags will be held in engagement with the rear walls 26 of the compartments, as best shown in Figure 5, so that the walls of the bag will be substantially alined with the walls of the compartment before the latter are actuated to compress the bag. The means provided for folding the wall portions of the bag mouth to close the bag is shown in Figures 2, 5, 9, 10, and 11, and comprises a pair of folding fingers 55 adapted to engage an end wall of the open bag mouth as shown in Figure 1, and fold it inwardly over the bag body, as shown in Figures 9 and 17. From the position shown in Figure 17, the fingers are moved outwardly, thereby spreading the folded wall portions to the positions shown in Figure 18, after which the fingers become disengaged from the bag walls as indicated in the dotted line positions at E in Figures 10 and 19.

Each finger 55 has one end portion secured in a head 56 pivotally mounted at one end of an arm 57, the opposite end of which is pivotally connected with one end of a drive arm 58 by means of a shouldered stud 59, as shown in Figure 11. As the fingers 55 and associated parts are alike, but one such mechanism will be described. The stud 59 has a small arm 61 secured thereto which is provided with a roller 62 adapted to ride upon the periphery of a relatively fixed cam 63. A spring 60 holds the roller 62 in peripheral engagement with the cam 63. The stud 59 is non-rotatably secured in the end portion 64 of the arm 57 so that when the relatively shorter arm 61 is oscillated by reason of the roller 62 engaging the periphery of the cam 63, the arm 57 will be oscillated about the axis of the pivot pin 59, as indicated by the dotted line position at F in Figure 10. An arm 65 here shown integrally formed with the drive arm 58, has a guide 66 pivoted thereon through which the finger 55 slides. The arms 58 and 65 are suitably secured to one end of a stub shaft 67, the opposite end of which has a pinion 68 suitably secured thereto. The shaft 67 is rotatably supported in a sleeve 71 secured in a hub 72 of the machine frame by such means as a suitable set screw 73. The cam 63 is suitably secured to the sleeve 71. The arm 65 is provided with an elongated recess 74 adapted to receive a tongue 75 here shown integrally formed with the arm 57.

Figure 13:
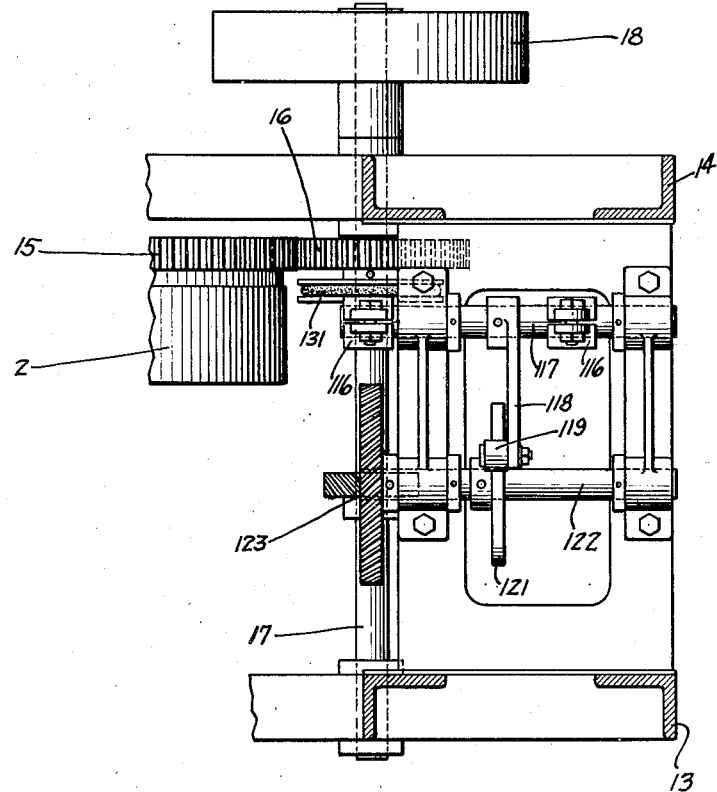
Figure 13 is a horizontal sectional view on the line 13—13 of Figure 12, showing only a portion of the machine including the mechanism for actuating the bag ejecting means.
Figure 18:
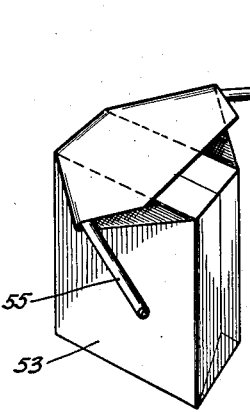
Figure 18 is a view illustrating the second step.
Figure 19:
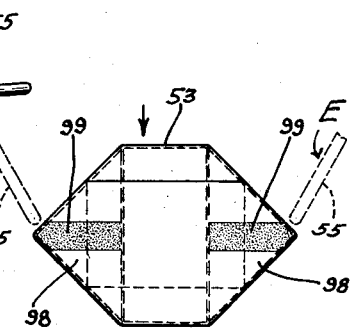
Figure 19 is a plan view of Figure 18, indicating the folding fingers in dotted lines.

The stub shafts 67 are adapted to be rotated in opposite directions from a shaft 76 having suitable pinions 77 mounted thereon adapted to mesh with the pinions 68 secured to the stub shafts 67. When the stub shafts 67 are rotated, the arms 58 and 65 will rotate therewith, as indicated by the arrows in Figure 10, because of said arms being secured to the shafts 67, as shown at 77 in Figure 11. Such rotation of the arms 65 will cause the arms 57 to oscillate about the axes of the pivot pins 59, as indicated by the dotted line positions at F and G in Figure 10, because of the shapes of the peripheries of the cams 63 upon which the rollers 62 travel during rotation of the arms 65. The cams 63, as hereinbefore stated, are secured in fixed relation so that as the arms 65 rotate about the axes of the stub shafts 67, the rollers 62 will ride upon the peripheries of the cams and cause the fingers to assume the various positions indicated by the full and dotted lines in Figure 10, for each cycle of operation. The fingers 55 are adapted to spread a portion of the gum 92 applied to the first folded end wall, outwardly over other surfaces of the bag mouth walls, so that when the end walls are over-lapped as shown in Figures 13, 18 and 19, said walls will become united by the gum. Each finger 55 is provided with suitable means such as a recess 55ª, adjacent its outer end, whereby a portion of the gum 92 applied to the first wall to be folded will remain thereon, when the fingers engage and slide over the surface of said wall, as will readily be understood by reference to Figures 17 and 18. The fingers 55 thus assist in spreading the adhesive over the surfaces of the wall portions to be folded.

The operation of the folding fingers 55 is so timed relative to the rotation of the drum 2, that when a bag delivered into a compartment at B reaches the position indicated at C in Figure 1, the forward terminals of the fingers will engage the rear end wall of the bag and fold it inwardly over the bag body, as shown in Figure 9. As the bag continues forwardly, the end wall at the opposite or leading side of the bag mouth will engage upturned spaced-apart strips or guides 79, whereby the leading end wall of the bag mouth will be folded inwardly over the rear end wall, as best shown in Figure 18, and, at the same time, the folding fingers 55 will move outwardly and spread the partially folded wall portions of the bag mouth so that one of said extending wall portions will be positioned over one of a plurality of flat surfaces 81 provided on the periphery of the drum 2. The extending wall portions at the opposite side of the bag will be positioned over the upper end surface 80 of the adjacent side wall member 21 of the compartment in which the bag is supported.

When the partially folded wall portions are positioned as shown in the upper portion of Figure 6, and the bag continues forwardly by rotation of the drum 2, rotatable presser feet 82 will engage said extending wall portions and press them firmly against the flat face 81 of the drum 2 and the upper end 80 of the side wall member 21, thereby creasing said folded wall portions so that they will retain their folded positions as the bag continues forwardly during the operation of closing the bag top.

Figure 16:
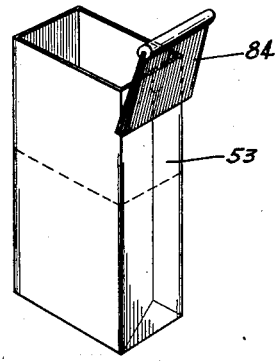
Figure 16 is a similar view diagrammatically illustrating a means for gumming a surface of a wall portion before the latter is folded.

Means are provided for gumming surfaces of the wall portions of the bag mouth so that when said wall portions are folded, they may be secured in closing relation. Such a means is shown in Figures 1, 2, and 16 and comprises a small wiper or brush 84 pivotally secured to one end of an arm 85 which is pivotally mounted upon an arm 86 secured to the shaft 76 and adapted for rotation therewith. The opposite end of the arm 85 is shown provided with a roller 87 adapted to ride upon the periphery of an irregularly shaped cam 88, secured in fixed relation to the upper portion 89 of the machine frame. The cam 88 is so shaped that when the arm 86 rotates about the axis of the shaft 76 in the direction indicated by the arrow in Figure 1, the brush 84 will wipe across the periphery of a gumming roller 91, as shown in Figure 2. The roller 91 is suitably mounted upon the machine frame, as indicated in Figure 1. In Figure 1, the arm 86 is shown positioned so that the brush 84 will engage the upper portion of the bag mouth wall, thereby gumming said surface, as indicated at 92 in Figure 17. (See also Figure 16.) It will thus be seen that when the front wall portion of the bag mouth is folded over the rear portion thereof, as shown in Figure 18, the two wall portions will become united by the action of the gum.

The gumming roller 91 is supplied with gum by means of a transfer roller 93 peripherally engaged with a gum feed roller 94 the lower portion of which is submerged in a suitable adhesive or gum 95, contained in a tank 96, suitably supported upon the machine frame (see Figure 1). The feed roller 94 is provided with suitable means 97 whereby it may be moved into and out of frictional engagement with the transfer roller 93 to control the amount of gum delivered into the peripheries of the rollers 91 and 93.

Figure 20:
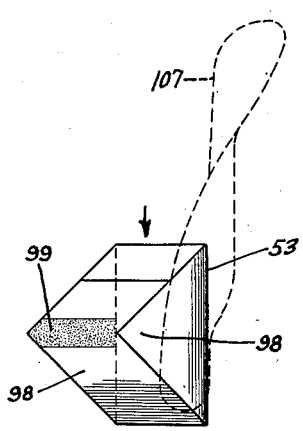
Figure 20 is a plan view of a partially closed bag, indicating in dotted lines the means for folding inwardly one side of the partially folded bag top.

Means are also provided for gumming the upper surfaces of the extended wall portions 98 of the partially closed bag mouth, as indicated at 99 in Figures 19 and 20. Such a means is shown in Figures 1, 5, and 6, and consists of a gumming element 101 yieldably supported in each presser foot 82. These gumming elements are adapted to engage the surface of the transfer roller 93 and thereby receive a quantity of gum which will be transferred onto the top surfaces of the extended wall portions 98 of the bag top, as the presser feet engage said extending wall portions and compress them between the periphery of the drum 2 and top of the side plate member 21. The presser feet 82 are suitably secured to a shaft 102 having a geared connection with the shaft 76 by means of an intermediate gear 103 which meshes with a gear 104 secured to the shaft 76, and a similar gear 105 secured to the shaft 102. A gear 100 operatively connects the shaft 102 with the ring gear 15 on the drum 2.

Figure 21:
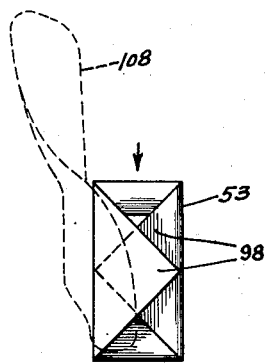
Figure 21 is a similar view illustrating in dotted lines the means for completing the folding of the bag top.

Continuing with the operation of folding the bag top, when the partially folded bag top leaves the position shown in Figures 5 and 6, the partially folded wall portions thereof will be retained in folded positions by means of curved portions 106 of the strap members 79, until one of the laterally extending partially folded wall portions engages a curved folding member 107 which will fold said portion inwardly over the top of the bag, as shown in Figure 20. Following this operation, the oppositely extending wall portion 98 will engage a folding member 108 which will fold it inwardly over the bag top and over said first folded wall portion, as shown in Figure 21, thereby completing the folding of the wall portions of the bag mouth to close the bag.

When the folded bag top leaves the folding element 108, the bag top will engage a flexible member 109 which will retain the folded wall portions in closing relation until the closed bag reaches the position indicated at A in Figure 1, whereupon the walls of the compartment will be actuated to release the bag, as shown in this figure, permitting the bag to be delivered onto a flexible element 111 which will be deflected by the weight of the bag, as shown in Figure 2, and thus permit the bag to be delivered onto a suitable conveyer 112 which will convey the bay to the position shown at the extreme right hand side of Figure 1, against an abutment plate 113. Suitable walls 114 are provided at each side of the conveyor 112 to hold the filled bags upon the conveyer.

By reference to Figures 1 and 2, it will be noted that the bags are delivered onto the conveyer belt 112 in an inverted position whereby the weight of the bags will cause the folded wall portions thereof to be held in closing relation while the gum or adhesive sets, so that when the sealed bags are finally discharged from the machine, the gum will be sufficiently set to permit handling of the bags without danger of the bag top accidentally becoming opened.

Figure 12:
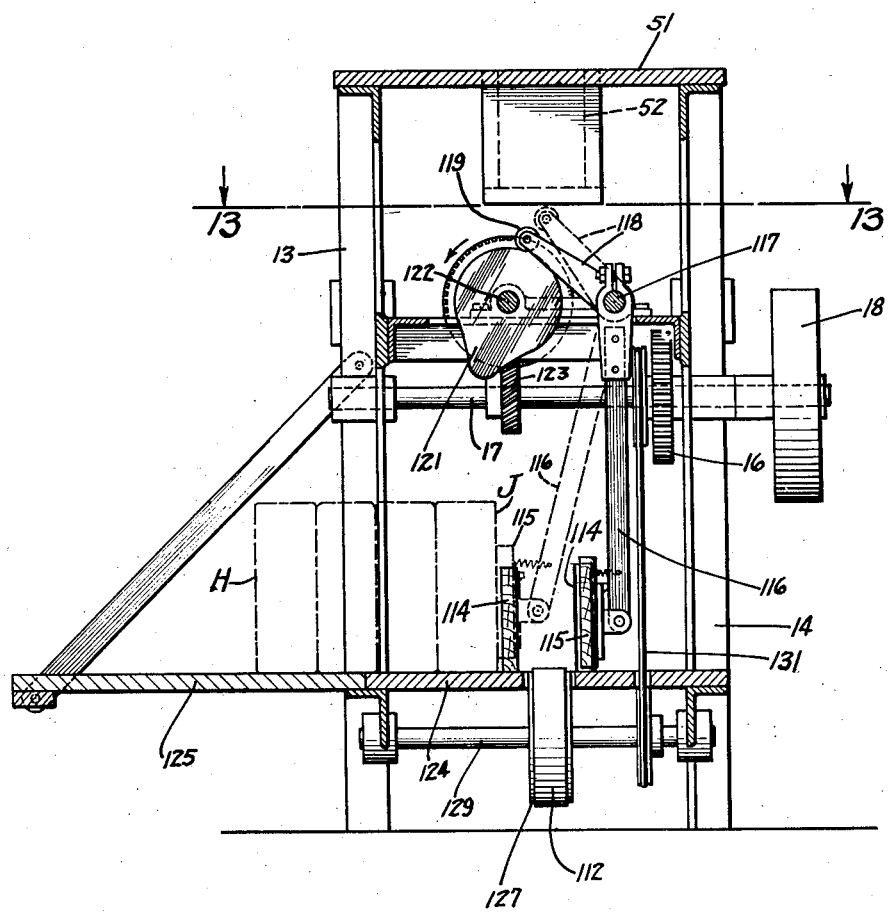
Figure 12 is a detail sectional view on the line 12—12 of Figure 1, showing a means for ejecting the sealed bags from the machine.

In Figure 12, there is shown a mechanism for ejecting the sealed bags from the machine. This mechanism comprises an ejector 115 pivotally supported upon the lower ends of pivotally mounted arms 116 secured to a rock shaft 117 having an arm 118 secured thereto. The arm 118 is shown provided with a roller 119 adapted to ride upon the periphery of a cam 121 secured to a shaft 122 having a driving connection with the drive shaft 17 by means of a spiral gear drive 123, shown in Figures 12 and 13. The cam 121 is so shaped and timed relative to the operation of the drum 2, that each time two bags have been delivered onto the conveyer 112 and conveyed to the positions shown at the right hand side of Figure 1, it will operate the ejector 115 and cause it to laterally eject the two sealed bags from the conveyer 112 to the dotted line position indicated at J in Figure 12. The ejector 115 is returned to its normal position, shown in full lines in Figure 12, before the next bag reaches the ends of the side walls 14 of the conveyer, shown in Figure 2. A suitable base plate 124 is provided in the lower portion of the machine frame adapted to support the upper run of the conveyer belt 112 and also the closed bags discharged from the drum, as shown in Figures 1 and 12. The face plate 124 has an extension 125 onto which the sealed bags are delivered, as indicated by the dotted lines H in Figure 12.

The conveyer belt 112 is shown mounted upon rollers 126 and 127 supported by shafts 128 and 129, respectively, as shown in Figure 1. The conveyer 112 may be driven by means of a belt drive 131 from the drive shaft 17.

In the operation of this novel bag closing and sealing machine, the filled bags are delivered into the chute 52 and slide downwardly into the open compartment of the continuously rotating drum 2 by gravity, as indicated in Figure 1. Paper bags filled in an ordinary bag filling machine are usually shaped as shown in Figure 14, and it is therefore desirable to shape the bag bodies, particularly the upper portions thereof, before the open tops thereof are closed and sealed. As the drum 2 rotates, the walls of the compartment which has just received a bag, will be actuated to compress the bag body, as shown in Figure 1, thereby shaping the bag to substantially the form shown in Figures 15 and 16. Continued rotation of the drum will cause the folding fingers 55 to engage the rear gummed end wall of the bag mouth and fold it inwardly, as hereinbefore described, after which the leading end wall of the bag will engage the inclined end portions of the strap members 79, as shown in Figure 9, whereby said leading end wall will be folded over the first folded end wall in over-lapping relation as shown in Figure 18. As the fingers 55 move from the positions shown in Figure 17 to that shown in Figure 18, they spread a portion of the gum 92 outwardly over ungummed surfaces of the bag walls so that when said wall portions are folded, as shown in Figure 18, they will be united by the gum substantially the entire width of the extended wall portions, as will readily be understood.

Continued rotation of the drum will cause the completion of the folding operation, as hereinbefore described, and the bags will be discharged from the lower portion of the drum onto the conveyer 112 in an inverted position. The belt 112 will convey the sealed bags towards the abutment plate 113, as shown in the lower right hand corner of Figure 1, after which the ejector 115 is actuated to laterally move the sealed bags from the conveyer 112 to the position indicated at G in Figure 12. The bags may be retained in an inverted position until the gum has thoroly set, after which the sealed bags may be conveniently handled without danger of the tops thereof accidentally opening.

Figure 22:
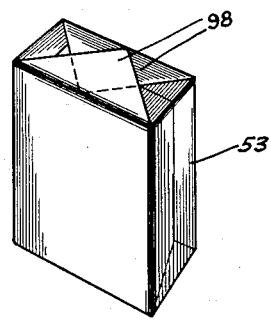
Figure 22 is a perspective view showing a filled bag closed and sealed.

By the employment of this novel machine, the bags are closed and sealed without the use of tape, strings or other separable securing means, as is now common practice. Also, by folding the bag tops and shaping the bag bodies in the particular manner herein described, the bags, when closed and sealed, will be substantially rectangular in configuration, and uniform in size, whereby they may readily be stacked one upon another on shelves for storage or display purposes, and the bags will present a very neat appearance as will be noted by reference to Figure 22. The machine is particularly useful for closing and sealing bags, the walls of which have not previously been creased or folded to facilitate folding.

I claim as my invention:

1. In an apparatus of the class described, a member provided with a compartment adapted to receive a filled container, means for moving a wall of the compartment to compress the body of a container supported therein, means for folding portions of the walls of the container mouth inwardly over the container body and then spreading other portions thereof outwardly beyond the container body, whereby opposite wall portions thereof will be disposed in overlapping relation, and means for folding said extended wall portions against the body of the bag to close the container mouth.

2. In an apparatus of the class described, a member provided with a compartment adapted to receive a filled container, means for moving a wall of the compartment to compress the body of a container supported therein, means for folding portions of the walls of the container mouth inwardly over the container body and then spreading other portions thereof outwardly beyond the sides of the container body, whereby opposite wall portions thereof will be disposed in overlapping relation, and means for folding said extended wall portions inwardly, over the container body and in overlapping relation, whereby the container mouth is sealed.

3. In an apparatus of the class described, a member provided with a compartment adapted to receive a filled container, means for shaping the body of a container supported therein to facilitate closing the open top thereof, rotatable means for folding portions of the walls of the container mouth inwardly over the container body and also extending other portions thereof outwardly beyond the container body, means for folding said extended wall portions inwardly against the body of the container, and means for securing said folded wall portions in closing relation.

4. In an apparatus of the class described, a movable member provided with a compartment adapted to receive a filled container, means for moving a wall of the compartment to compress the body of a container supported therein to facilitate closing the open top thereof, means mounted for rotary movement in a plane substantially parallel to the top of the container and adapted to fold a wall of the container mouth inwardly over the container body, and extend other wall portions thereof outwardly beyond the sides of the container body, means for folding said extended wall portions inwardly over the top of the container body, and means for securing said folded wall portions in closing relation.

5. In an apparatus of the class described, a continuously movable member provided with a compartment adapted to receive a filled container, means for moving a wall of the compartment to shape the body of the container supported therein to facilitate closing the open top thereof, means for gumming a portion of the outer surface of a wall of the container mouth, means for folding said gummed wall portion inwardly over the container body and laterally extending other wall portions of the container mouth outwardly beyond the container body, means for compressing said extended wall portions, and means for folding said extended wall portions inwardly over the container body to close the open top of the container.

6. In an apparatus of the class described, a movable member provided with a compartment adapted to receive a filled container, means for gumming a portion of the outer surface of a wall of the container mouth, means for folding said gummed wall portion inwardly over the container body and spreading portions of the gum applied thereto to other wall surfaces, said folding means also extending other portions of the bag top walls outwardly beyond the container body, means for compressing said extended wall portions, means for gumming surfaces of said extended wall portions, means for folding said extended wall portions inwardly over the bag body, and means for temporarily holding said folded wall portions in folded positions to allow the gum to set.

7. In an apparatus of the class described, a member mounted for continuous rotary movement and provided with a compartment adapted to receive a filled container, means for shaping the body of a container supported in said compartment, means for gumming a portion of the outer surface of a wall of the container mouth, means for folding said gummed wall portion inwardly over the container body and simultaneously spreading portions of the gum applied thereto to other wall surfaces, said folding means also extending other portions of the bag top walls outwardly beyond the container body, means for compressing said extended wall portions, means for gumming upper surfaces of said extended wall portions, means for folding said extended wall portions inwardly over the bag body, and means for temporarily holding said folded wall portions in folded positions to allow the gum to set.

8. In a bag closing and sealing machine, a member mounted for continuous rotary movement and provided with a plurality of compartments each adapted to receive a filled bag, means for actuating a wall of each compartment whereby the bodies of the bags supported therein are shaped to facilitate closing the open tops thereof, means for folding a portion of the walls of the open bag top inwardly over the bag body and laterally spreading other portions thereof outwardly beyond the bag body, whereby an oppositely disposed wall portion is folded over said first folded wall portion, means for compressing said extended wall portions, means for gumming upper surfaces of said extended wall portions, and means for folding said extended wall portions inwardly over the bag body in closing relation and temporarily holding them to allow the gum to set.

9. In a bag closing and sealing machine, a continuously rotatable member provided with a plurality of compartments each having a movable wall and each adapted to contain a filled bag, means for actuating the movable walls of said compartments to compress the bodies of the bags supported therein, means for gumming an outer surface of an end wall of the bag top, means for folding said gummed end wall inwardly over the bag body and simultaneously laterally spreading other portions of the bag top outwardly beyond the body of the bag, whereby an oppositely disposed wall portion is folded inwardly over said first folded wall portion, means for compressing said extended wall portions to crease them, means for gumming surfaces of said extended wall portions, and means for folding said extended wall portions inwardly over the bag body to close and seal the bag.

10. In a bag closing and sealing machine, a rotable member provided with a plurality of compartments each adapted to receive a filled bag, folding fingers mounted to engage a wall of the open bag top and fold it inwardly over the bag body, means for actuating said fingers to cause them to extend portions of said partially folded wall portions outwardly beyond the sides of the bag body, and means for folding said extended wall portions inwardly over the bag body in closing relation.

11. In a bag closing and sealing machine, a rotatable member provided with a plurality of compartments each adapted to receive a filled bag, folding fingers mounted to engage a wall of the open bag top and fold it inwardly over the bag body, means for actuating said fingers to cause them to spread portions of said partially folded walls outwardly beyond the sides of the bag body, means for folding said extended wall portions inwardly over the bag body in closing relation, and means for gumming surfaces of the wall portions being folded to secure them in sealed relation.

12. In a bag closing and sealing machine, a rotatable member provided with a plurality of compartments each adapted to receive a filled bag, folding fingers mounted for rotary movement and adapted to engage a wall of the open bag top and fold it inwardly over the bag body, cam means for actuating said fingers to cause them to laterally spread portions of said folded wall portions beyond the sides of the bag body, means for compressing said laterally extending wall portions, and means for folding said extended wall portions inwardly over the bag body, one over the other, in closing relation.

13. In a bag closing and sealing machine, a rotatable member provided with a plurality of compartments each adapted to receive a filled bag, means for shaping the body of the bag, folding fingers mounted for rotary movement and adapted to engage a wall of an open bag top and fold it inwardly over the bag body, means for folding an oppositely disposed wall portion of the bag top over said first folded wall portion, and means for compressing the remaining wall portions and folding them inwardly over the bag body in closing relation.

14. In a bag closing and sealing machine, a drum provided with a plurality of compartments each adapted to receive a filled bag, folding fingers mounted for rotary movement and adapted to engage a wall of the open bag top and fold it inwardly over the bag, means for actuating said fingers to cause them to spread portions of said partially folded wall portions outwardly beyond the sides of the bag body, means for compressing said laterally extending wall portions, means for gumming surfaces of said extending wall portions, and means for folding said laterally extending wall portions inwardly over the bag body in closing relation.

15. In a bag closing and sealing machine, a member provided with a plurality of compartments having movable walls and each adapted to receive a filled bag, means for actuating said movable walls to shape the bag bodies, folding fingers adapted to engage a wall of an open bag top and fold it inwardly over and against the top of the bag body, cam means for actuating said fingers to cause them to spread portions of said partially folded wall portions outwardly whereby portions thereof will extend laterally beyond the sides of the bag body, means for compressing said laterally extending wall portions, means for gumming upper surfaces of said extending wall portions simultaneously as they are compressed, means for folding said laterally extending wall portions inwardly over the bag body in closing relation, and means for temporarily holding said folded wall portions in folded positions to allow the gum to set and seal the bag top.

16. In a bag closing and sealing machine, a drum provided with a plurality of compartments each adapted to receive a filled bag, folding fingers mounted for rotary movement and adapted to engage a wall of the open bag top and fold it inwardly over the bag, means for actuating said fingers to cause them to spread portions of the partially folded wall portions outwardly beyond the sides of the bag body, means for compressing said laterally extending wall portions, means for gumming surfaces of said extending wall portions, means for folding said laterally extending wall portions inwardly over the bag body in closing relation, and means positioned to receive the sealed bags and discharge them from the machine.

17. In a bag closing and sealing machine, a drum provided with a plurality of compartments having movable walls and each adapted to receive a filled bag, means for actuating said movable walls to shape the bag bodies, folding fingers adapted to engage a wall of an open bag top and fold it inwardly over the bag body, cam means for actuating said fingers to cause them to spread portions of said partially folded wall portions outwardly whereby portions thereof will extend laterally beyond the sides of the bag body, means for compressing said laterally extending wall portions, means for gumming surfaces of said extending wall portions simultaneously as they are compressed, means for folding said laterally extending wall portions inwardly over the bag body in closing relation, conveyer means adapted to receive the sealed bags in an inverted position whereby the folded wall portions of the bag top will be retained in closed relation, and means for laterally discharging the sealed bags from the machine.

18. In a bag closing and sealing machine, a drum mounted for rotary movement and provided with a plurality of compartments, oppositely disposed walls of which are relatively movable, means for spreading apart said movable walls at the loading point to permit the insertion of a filled bag into each compartment, means for causing said movable compartment walls to compress the filled bag to shape the body thereof, folding fingers mounted over said drum adapted to engage a wall portion of the open bag mouth and fold it over the bag body, means positioned to be engaged by an oppositely disposed wall portion of the traveling bag mouth and fold it over said first folded wall portion whereby portions of the bag mouth walls will be laterally extended beyond the bag body, one of said laterally extending wall portions being positioned over a flattened surface in the periphery of the drum and the other of said extending wall portions overlying a flattened surface in the upper portion of a side wall of the compartment, means for pressing said laterally extending wall portions against said surfaces to crease said folded wall portions, and means for folding said compressed extending wall portions over the bag body in closing relation.

19. In a bag closing and sealing machine, a drum mounted for rotary movement and provided with a plurality of compartments, the end walls of which are relatively movable, means for spreading apart said movable walls at the loading point to permit the insertion of a filled bag into each compartment, means for causing said movable compartment walls to compress the filled bag to shape the body thereof, folding fingers mounted over said drum and adapted to engage an end wall of the open bag mouth and fold it over the bag body, means positioned to be engaged by the oppositely disposed end wall of the traveling bag mouth and fold said wall over said first folded end wall whereby portions of the walls of the bag mouth will be laterally extended beyond the bag body, one of said extending wall portions being positioned over a flattened surface in the periphery of the drum and the other of said extending wall portions overlying a flattened surface in the upper portion of a side wall of the compartment, means for pressing said laterally extending wall portions against said surfaces to crease said folded wall portions, means for gumming surfaces of said laterally extending wall portions, and means for folding said extending wall portions over the bag body in closing relation.

20. In a bag closing and sealing machine, a drum provided with a plurality of compartments each adapted to contain a filled bag, walls of each compartment being relatively movable and adapted to compress the filled bags in said compartments to shape the bodies thereof, means at the bottom of each compartment for squaring the bags therein, folding means adapted to engage a wall of the open bag mouth and fold it over the bag body, means positioned to be engaged by an oppositely disposed bag mouth wall and fold said wall over said first folded wall, means causing said folding means to spread portions of said partially folded wall portions laterally beyond the sides of the bag body, means for compressing said laterally extending wall portions, and means for holding said extending wall portions over the bag body in closing relation.

21. In a bag closing and sealing machine, a member mounted for continuous rotary movement and provided with a plurality of compartments each adapted to receive a filled bag, folding fingers mounted for rotary movement and adapted to engage a wall of an open bag top and fold it inwardly over the bag body, means for folding an oppositely disposed wall portion of the bag top over said first folded wall portion, means for compressing the remaining wall portions and folding them inwardly over the bag body in closing relation, a conveyer situated beneath said rotary member, means for causing the sealed bags to be discharged from said compartments onto said conveyor in inverted positions, and means for laterally discharging the sealed bags from said conveyer.

22. The method of closing the open top of a bag whose walls are composed of a flexible material, which consists in shaping the upper portion of the bag body to facilitate closing the open top thereof, applying an adhesive to a portion of the bag top walls, folding said gummed wall portion inwardly over the bag body and laterally extending other portions of the bag top walls outwardly beyond the bag body whereby an opposite wall portion is folded inwardly over said first folded wall portion, applying an adhesive to said laterally extending wall portions, and finally folding said laterally extending wall portions inwardly over said first folded wall portions in overlapping relation, whereby the bag is sealed.

23. The method of closing the open top of a bag whose walls are composed of a flexible material, which consists in applying pressure to the upper portion of the bag body to square it to facilitate closing the open top thereof, applying an adhesive to an outer surface of a portion of the bag top walls, folding said gummed wall portion inwardly over the bag body and laterally extending other portions of the bag top walls outwardly beyond the bag body whereby an opposite wall portion is folded inwardly over said first folded wall portion and into contact with the adhesive applied thereto, applying an adhesive to upper surfaces of said laterally extending wall portions, and finally folding said laterally extending wall portions inwardly over said first folded wall portions, one over the other, whereby the bag is sealed.

24. The method of closing the open top of a bag whose walls are composed of a flexible material, and whose body is rectangular in configuration cross-sectionally, which consists in shaping the upper portion of the bag body, applying an adhesive to an outer surface of an end wall of the bag top, folding said gummed end wall inwardly over the bag body, then laterally extending the side walls of the bag top outwardly beyond the bag body whereby the opposite end wall is folded inwardly over said first folded end wall and into contact with the adhesive applied thereto, applying an adhesive to upper surfaces of said laterally extending side walls, and finally folding said laterally extending side walls inwardly over said previously folded end walls, one over the other, whereby the bag is sealed.

In witness whereof, I have hereunto set my hand this 9th day of May, 1930.

DANIEL BELCHER.